US012738690B2

(12) United States Patent
Wolf et al.

(10) Patent No.: US 12,738,690 B2
(45) Date of Patent: Sep. 15, 2026

(54) MODULE CONNECTOR WITH AT LEAST ONE SLIDABLE SCREW AND CONNECTION ASSEMBLY WITH SUCH A MODULE CONNECTOR

(71) Applicant: TE Connectivity Germany GmbH, Bensheim (DE)

(72) Inventors: Marcus Wolf, Bensheim (DE); Maik Schaefer, Bensheim (DE); Bjoern Hoffmann, Bensheim (DE); Ron Buchholz, Bensheim (DE); Patrick Distler, Bensheim (DE); Manuel Eheim, Bensheim (DE)

(73) Assignee: TE Connectivity Solutions GmbH, Schaffhausen (CH)

(*) Notice: Subject to any disclaimer, the term of this patent is extended or adjusted under 35 U.S.C. 154(b) by 401 days.

(21) Appl. No.: 18/346,968

(22) Filed: Jul. 5, 2023

(65) Prior Publication Data

US 2024/0014599 A1 Jan. 11, 2024

(30) Foreign Application Priority Data

Jul. 5, 2022 (DE) ........................ 102022116785.2

(51) Int. Cl.
*H01R 13/631* (2006.01)
*H01M 50/503* (2021.01)
(Continued)

(52) U.S. Cl.
CPC ...... *H01R 13/6315* (2013.01); *H01M 50/503* (2021.01); *H01M 50/517* (2021.01); *H01R 4/34* (2013.01); *H01R 9/22* (2013.01)

(58) Field of Classification Search
CPC ...... H01R 13/65315; H01R 4/34; H01R 9/22; H01R 11/26; H01M 50/503; H01M 50/517; F16B 5/0225
(Continued)

(56) References Cited

U.S. PATENT DOCUMENTS

| | | | | |
|---|---|---|---|---|
| 9,520,656 B2 * | 12/2016 | Kakimi | ................ | H01R 4/305 |
| 2015/0075496 A1 * | 3/2015 | Pasquali | ............. | F02M 55/025 248/65 |

(Continued)

FOREIGN PATENT DOCUMENTS

| | | |
|---|---|---|
| DE | 2020140008721 U1 | 2/2015 |
| DE | 102016200451 A1 | 7/2017 |

(Continued)

OTHER PUBLICATIONS

Machine Translation of DE 102016200451 B4.*

(Continued)

*Primary Examiner* — Renee S Luebke
*Assistant Examiner* — Paul D Baillargeon
(74) *Attorney, Agent, or Firm* — Barley Snyder

(57) ABSTRACT

A module connector for electrically connecting two electric modules comprises a busbar, at least one screw and at least one screw guide. The busbar includes at least one flat face defining a busbar plane, and a through opening extending perpendicularly to the busbar plane and through the busbar. The at least one screw is held in the through hole, rotatable relative to the busbar and slidable parallel to the busbar plane. The at least one screw guide is rotatable relative to the busbar and held at least sectionally in the through opening. The at least one screw guide includes a hole extending parallel to the through opening in which the at least one screw is held at least sectionally.

21 Claims, 6 Drawing Sheets

(51) Int. Cl.
*H01M 50/517* (2021.01)
*H01R 4/34* (2006.01)
*H01R 9/22* (2006.01)

(58) Field of Classification Search
USPC .................................................. 439/781, 782
See application file for complete search history.

(56) References Cited

U.S. PATENT DOCUMENTS

| | | | | |
|---|---|---|---|---|
| 2016/0069066 | A1 | 3/2016 | Connell et al. | |
| 2018/0375227 | A1 | 12/2018 | Kaehny et al. | |
| 2021/0408721 | A1 * | 12/2021 | Wolf | H01R 13/44 |
| 2022/0231436 | A1 | 7/2022 | Buechling et al. | |
| 2023/0163541 | A1 | 5/2023 | Ellensohn et al. | |
| 2024/0339770 | A1 * | 10/2024 | Baumgartner | H01R 13/44 |

FOREIGN PATENT DOCUMENTS

| | | | |
|---|---|---|---|
| DE | 102016200451 | B4 | 8/2017 |
| DE | 102017210425 | A1 | 12/2018 |
| DE | 102021109667 | A1 | 10/2021 |
| DE | 102021100997 | B3 | 4/2022 |
| EP | 3982476 | A1 | 4/2022 |
| JP | 2019009115 | A | 1/2019 |
| JP | 2022111089 | A | 7/2022 |
| WO | 2004084351 | A2 | 9/2004 |

OTHER PUBLICATIONS

Korean Office Action dated Oct. 24, 2024 with English translation, corresponding to Application No. 10-2023-0085719, 14 pages.

Extended European Search Report dated Nov. 21, 2023, corresponding to Application No. 23183554.7-1201, 12 pages.

Japanese Office Action dated Aug. 6, 2024 with English translation, corresponding to App. No. 2023-108999, 11 pages.

Office Action from the Deutsches Patent- und Markenamt dated Feb. 17, 2023, corresponding to Application No. 10 2022 116 785.2, 5 pages.

European Patent Office Examination Report dated Jan. 12, 2026, corresponding to Application No. 23 183 554.7-1201, 11 pages.

Indian Examination Report dated May 21, 2026, corresponding to Application No. 202344043910, 8 pages.

* cited by examiner 14
26
88
76,78,90
38
98
94,104
86
106
40,42
16
20
110
96,108
68
100
118
76,80,92
114,116
66,112
10,12
74
102
30
62
18
76,82
4
76,84
2

44
40, 42
50
26
38
48
18
46
4
8
34
36
76
6
1

MODULE CONNECTOR WITH AT LEAST ONE SLIDABLE SCREW AND CONNECTION ASSEMBLY WITH SUCH A MODULE CONNECTOR

CROSS-REFERENCE TO RELATED APPLICATION

This application claims the benefit of German Patent Application No. 102022116785.2, filed Jul. 5, 2022, the whole disclosure of which is incorporated herein by reference.

FIELD OF THE INVENTION

Embodiments of the present disclosure relate to a module connector for electrically connecting two electric modules, in particular two battery modules. The battery modules are preferably battery modules for electric vehicles or power engineering systems. Furthermore, the present invention relates to a connection assembly with such a module connector.

BACKGROUND

In electrical systems, such as batteries having multiple batter modules, the relative position between two electric modules to be connected with a module connector is subject to tolerance-related fluctuations, even if the electric modules are arranged in a grid or other repeating structure. In order to compensate for these positional tolerances, conventional module connectors provide flexible conductor sections, for example made of braided copper wire, which enable the position of fastening means of the module connector (e.g., screws) to be adapted to the different relative positions of the electric modules.

However, these flexible conductor sections have to be bent to shape, sometimes with a high degree of force, and often apply an elastic restoring force to the module connector after it has been installed. In addition, the length of the flexible conductor sections influences their flexibility. In other words, the shorter the flexible conductor section, the smaller the compensable position tolerance.

Thus, there is a need to connect electric modules despite positional tolerances, irrespective of their relative position, and in particular irrespective of their distance, without exerting a high degree of force.

SUMMARY

According to an embodiment of the present disclosure, a module connector for electrically connecting two electric modules comprises a busbar, at least one screw and at least one screw guide. The busbar includes at least one flat face defining a busbar plane, and a through opening extending perpendicularly to the busbar plane and through the busbar. The at least one screw is held in the through hole, rotatable relative to the busbar and slidable parallel to the busbar plane. The at least one screw guide is rotatable relative to the busbar and held at least sectionally in the through opening. The at least one screw guide includes a hole extending parallel to the through opening in which the at least one screw is held at least sectionally.

BRIEF DESCRIPTION OF THE DRAWINGS

The invention will now be described by way of example with reference to the accompanying Figures, of which.

DETAILED DESCRIPTION OF THE EMBODIMENTS

Figure 1:
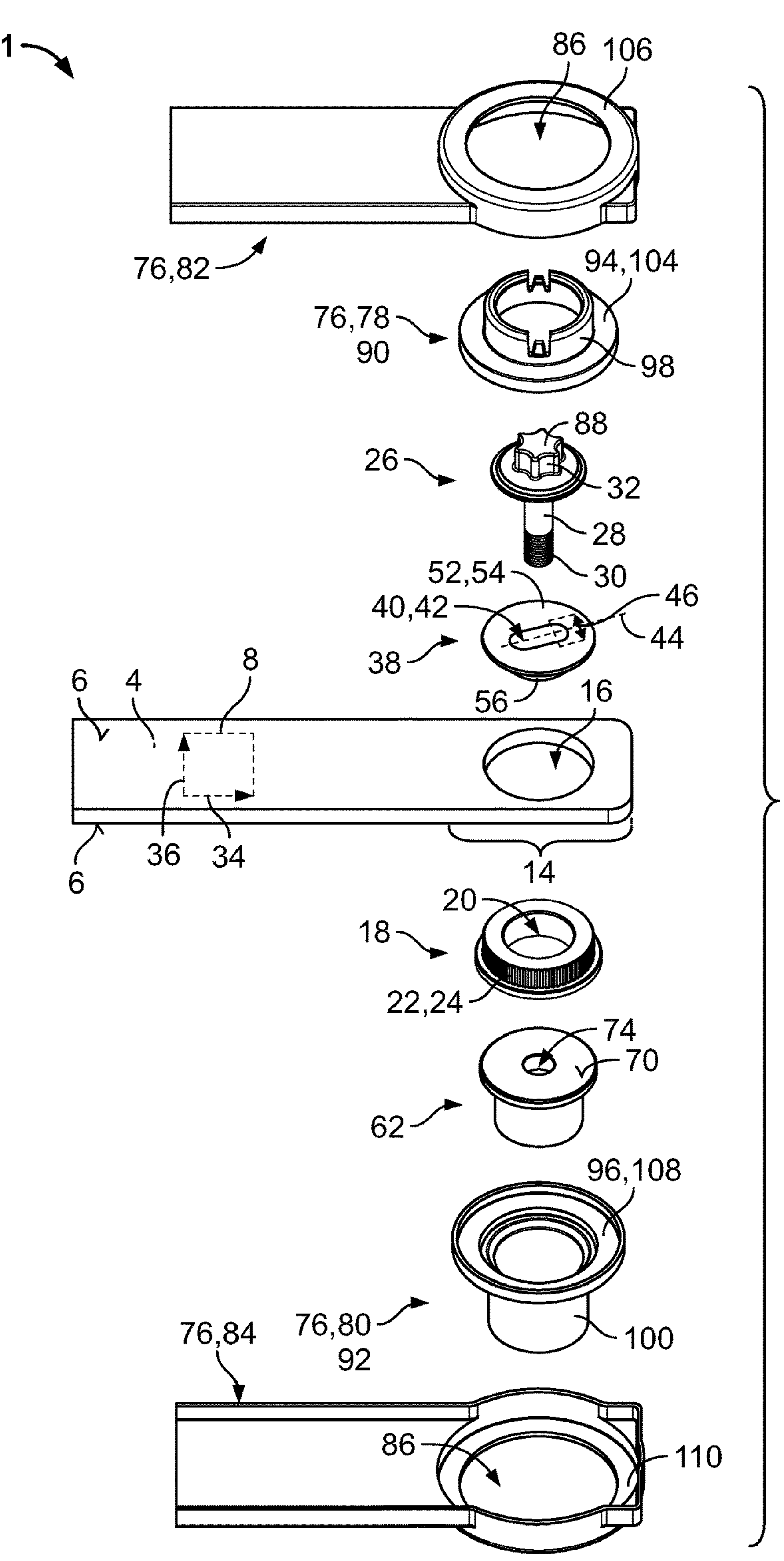
FIG. 1 is a schematic perspective exploded view of a module connector according to an exemplary embodiment.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
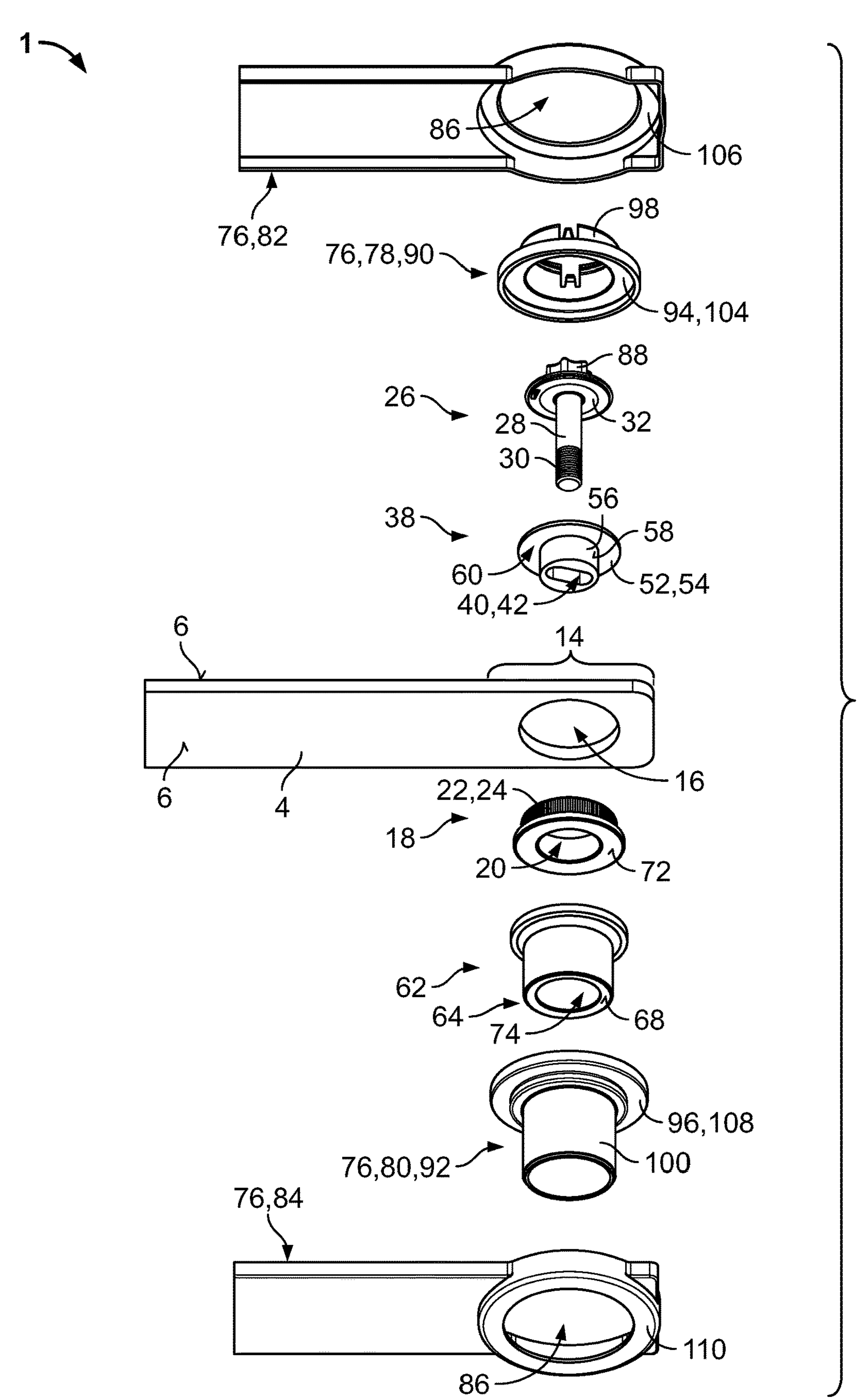
FIG. 2 is another schematic perspective exploded view of the module connector of FIG. 1.
Figure 3:
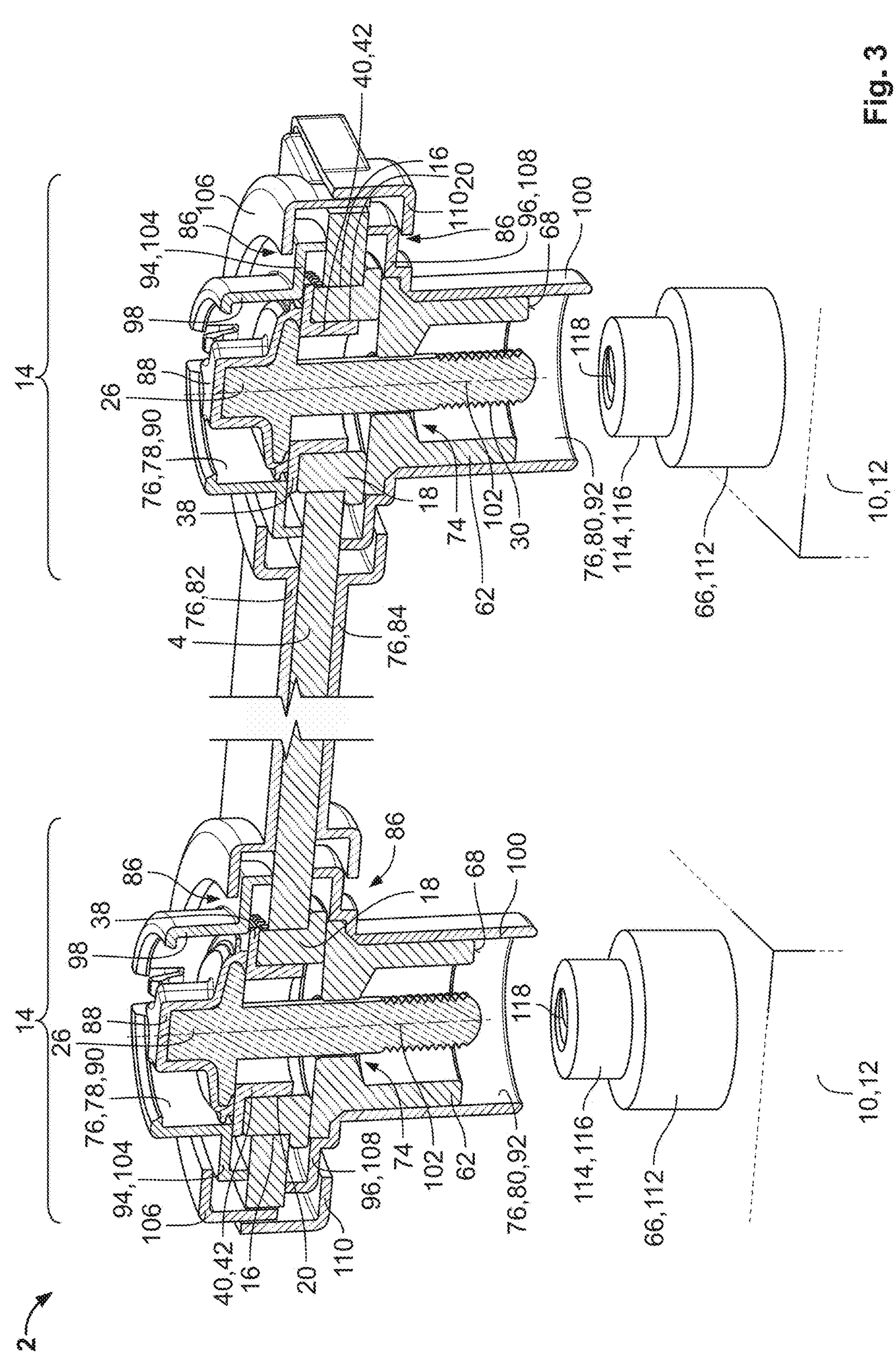
FIG. 3 is a schematic perspective partial sectional view of a connection assembly according to an exemplary embodiment.
Figure 4:
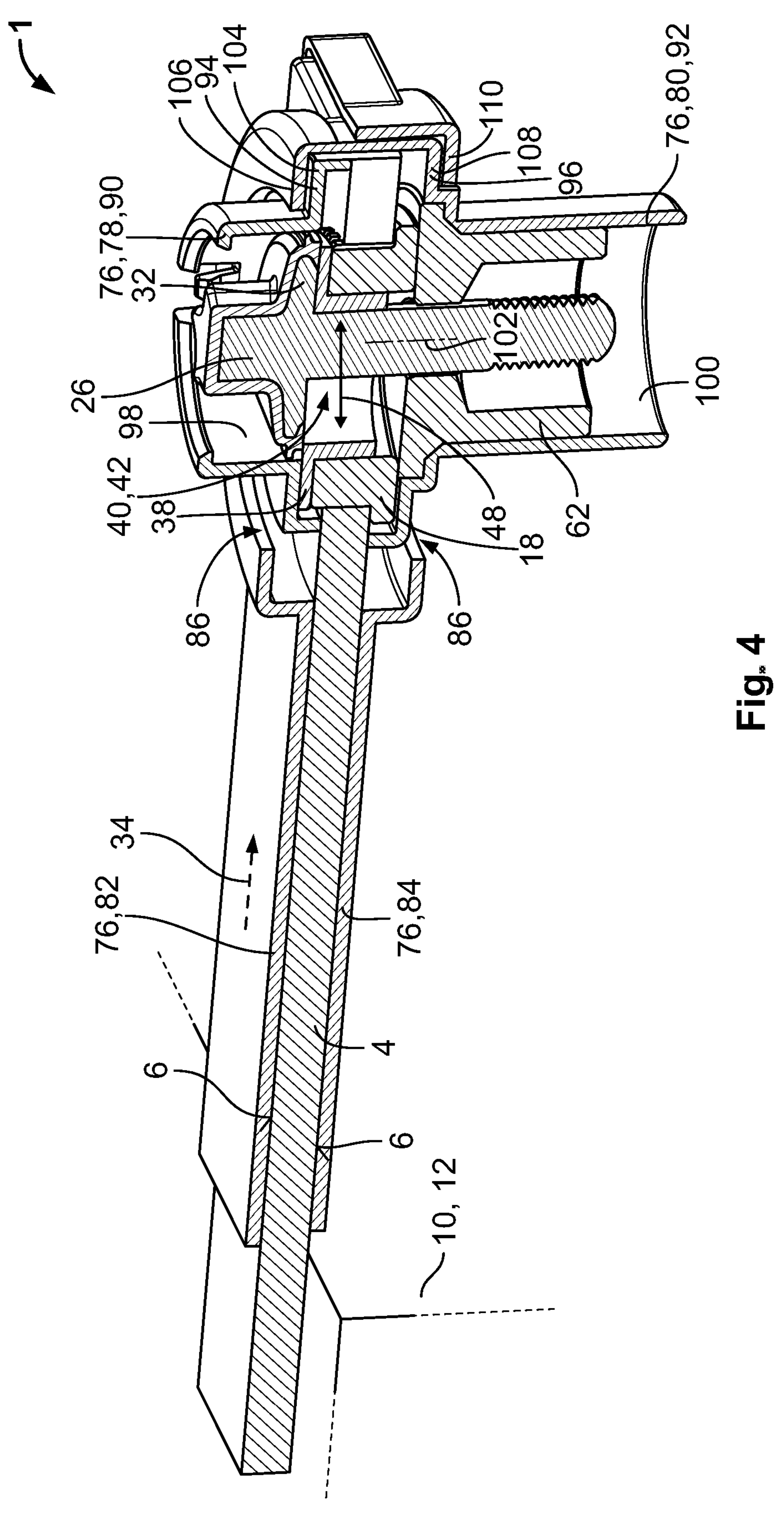
FIG. 4 is a schematic perspective sectional view of the module connector of FIG. 1.
Figure 5:
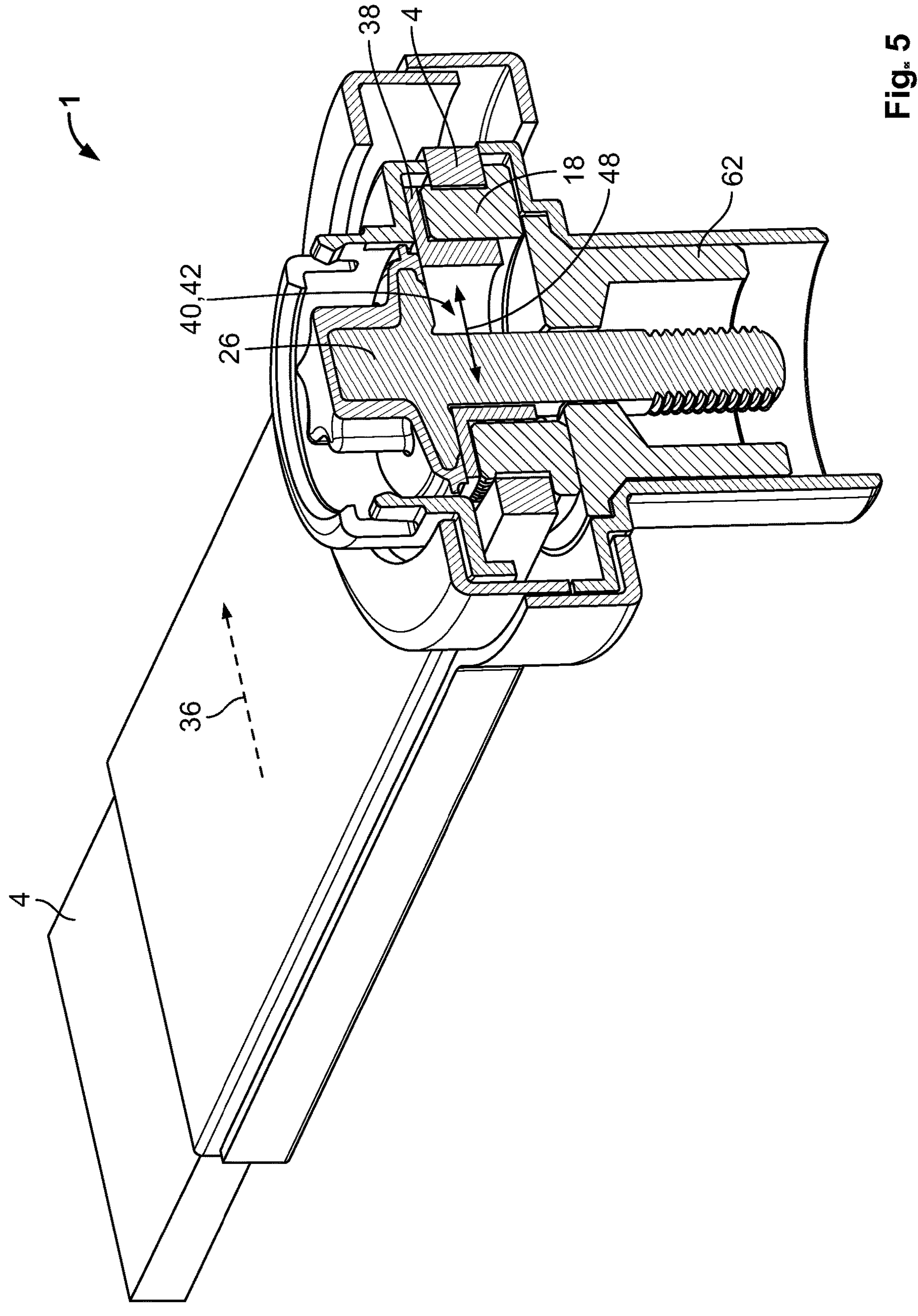
FIG. 5 is another schematic perspective sectional view of the module connector of FIG. 1 with a different sectional plane.
Figure 6:
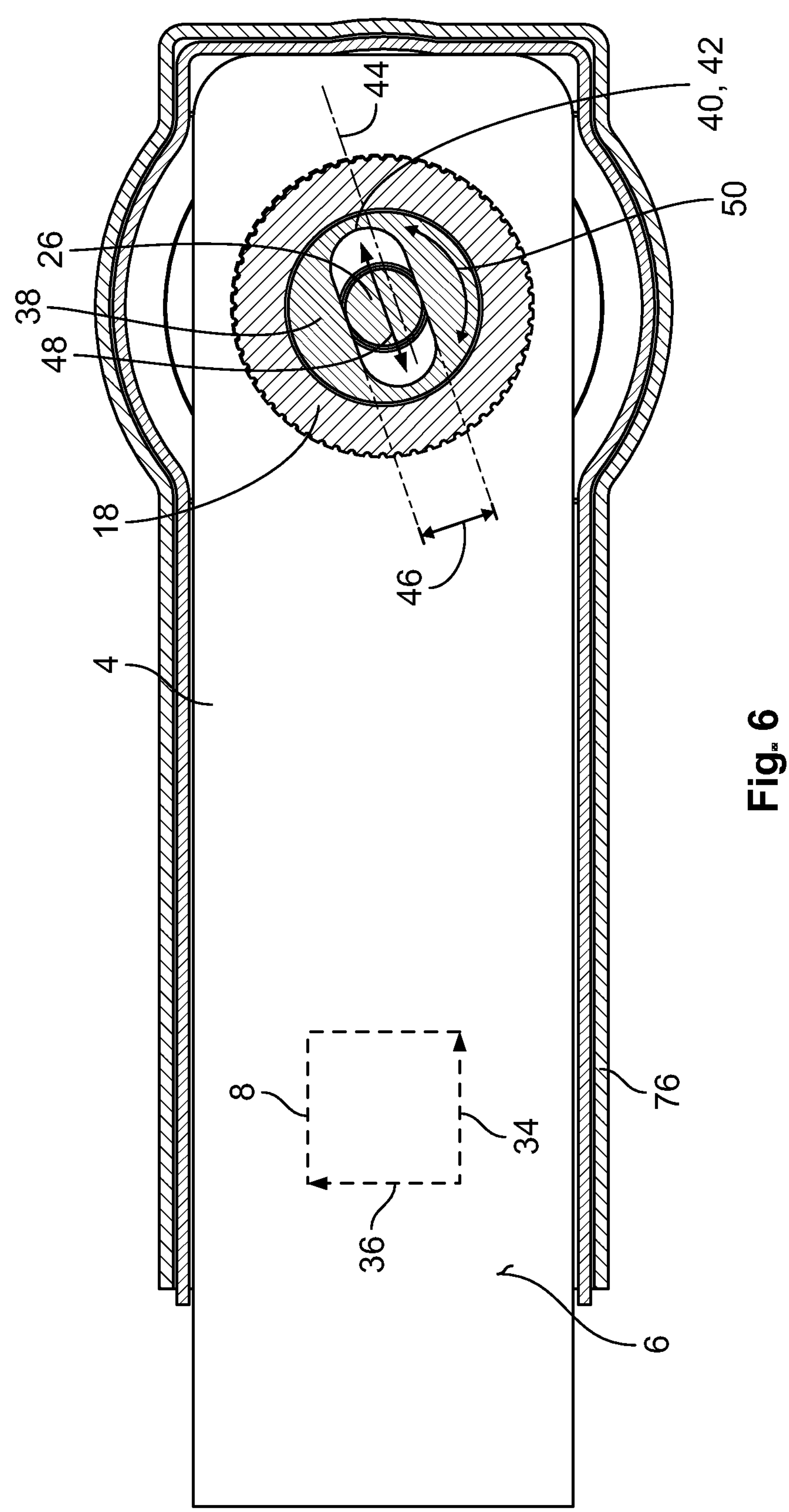
FIG. 6 is another schematic sectional view of the module connector of FIG. 1 with a different sectional plane in top view.

In the following, a module connector 1 according to an exemplary embodiment is described with reference to FIGS. 1-6. Furthermore, a connection assembly 2 according to an exemplary embodiment is described with reference to FIG. 3. In FIGS. 1 and 2, the module connector 1 is shown in exploded view from two different perspectives. In FIGS. 4, 5 and 6, the module connector 1 is shown in sectional view relative to three different sectional planes. In FIG. 3, the connection assembly 2 and the module connector 1 are shown in a partial sectional view. The connection assembly 2 is used to connect two electric modules 10, for example two battery modules 12, and in particular two battery modules of an electric vehicle (not shown), to each other in an electrically conductive manner via the module connector 1.

The module connector 1 comprises a busbar 4. The busbar 4 has at least one flat face 6 that defines a busbar plane 8. Preferably, the busbar 4 has two flat faces 6 that are parallel and opposite each other. Upon connecting the electric modules 10, the flat faces 6 of the busbar 4 are aligned facing toward and away from the electric modules (see FIG. 3). In the embodiment shown, the busbar 4 has a rectangular conductor cross-section. Other conductor cross-sections, for example square, polygonal, circular oval or U-shaped conductor cross-sections are also possible without departing from the scope of the present disclosure.

According to an embodiment not shown, the busbar 4 may comprise a bend, for example a U-shaped bend. Alternatively, the busbar 4 can have a flexible conductor section, for example a cable, a knitted fabric, a woven fabric or a braid.

The flexible conductor section or the bend serve exclusively to compensate for temperature-related changes in length, rather than to provide adjustment for inconsistent spacing of the electric modules 10.

At least one section of the busbar 4, in particular an end section 14, comprises a through hole or opening 16 extending through the busbar perpendicular to the busbar plane 8. The through opening 16 connects both flat faces 6 of the busbar 4 to each other. In the embodiment shown, the through opening 16 of the busbar 4 is adapted to be circular and with a constant inner diameter. According to an embodiment, the through opening 16 of the busbar 4 can also be stepped. In other words, the inner edge of the through opening 16 may comprise a stepped shoulder. Alternatively, the through opening 16 of the busbar 4 can have a conical inner edge, i.e., an edge with an inner cone.

By way of example, the busbar 4 may be made of copper, copper alloy, aluminum or aluminum alloy. If the busbar 4 is made of aluminum or aluminum alloy, the module connector 1 comprises at least one contact bridge 18 of copper or copper alloy adapted complementary to the through opening 16 to reduce the electrical resistance. The contact bridge 18 is adapted to be pressed into the through opening 16 of the busbar 4, at least sectionally. For this purpose, the contact bridge 18 comprises a knurled section 22. In particular, the section 22 which is pressed into the through opening 16 has a knurl 24 projecting radially outwardly, wherein an outer diameter of the knurl is slightly larger than an inner diameter of the through opening 16. Alternatively or additionally, the contact bridge 18 may be welded into the through opening 16. The contact bridge 18 has a central opening 20 that is preferably parallel and coaxial with the through opening 16. The central opening 20 of the embodiment shown is adapted to be circular and with a constant inner diameter. Optionally, the central opening 20 may be configured to be stepped or conical.

For attachment to the respective electric modules 10, the module connector 1 has at least one screw 26 that is rotatable relative to the busbar 4. The screw 26 shown has a screw shaft 28 with an external thread 30 and a screw head 32 attached to the screw shaft. According to an embodiment not shown, the screw 26 may also have one or more latching elements or a bayonet lock instead of the external thread 30.

As will be explained in more detail below, the screw 26 is held slidably parallel to the busbar plane 8 in the through opening 16 of the busbar 4 and in the central opening 20 of the contact bridge 18. In particular, the screw 26 is slidably held simultaneously or successively along two mutually perpendicular directions 34, 36, wherein the two directions are both parallel to the busbar plane 8. Thus, the screw 26 can be slid as desired along the busbar plane 8 by a linear combination of movements in the direction 34 and the direction 36 within a certain radius of movement.

In order to achieve this type of slidability or translatability of the screw 26, the module connector 1 comprises at least one disk-shaped screw guide 38. The screw guide 38 is held at least sectionally in the through opening and is rotatable relative to the busbar 4. If a contact bridge 18 is provided, the screw guide 38 can also be held at least sectionally in the central opening 20 of the contact bridge and be rotatable relative to the contact bridge.

In order to improve the rotatability of the screw guide 38 in the through opening 16 of the busbar 4 or in the central opening 20 of the contact bridge 18, an outer edge of the screw guide is adapted to be circular. In particular, the screw guide 38 has a cylindrical section 56 with a circular shell surface 58, which is inserted into the central opening 20 of the contact bridge 18 or into the through opening 16 of the busbar 4. For this purpose, the cylindrical section 56 has an outer diameter that is less than or equal to the inner diameter of the central opening 20 of the contact bridge 18 or less than or equal to the inner diameter of the through opening 16 of the busbar 4.

The screw guide 38 comprises a hole 40 extending parallel to the through opening 16 of the busbar 4 and parallel to the central opening 20 of the contact bridge 18, in which the screw 26 is held at least sectionally. In particular, the screw shaft 28 is inserted through the hole 40 of the screw guide 38. The screw head 32 rests on the screw guide 38 (see FIG. 4). In the embodiment shown in FIG. 1, the hole 40 of the screw guide 38 is adapted as a straight oblong hole 42, the longitudinal direction 44 of which extends parallel to the busbar plane 8. The width 46 of the oblong hole 42 measured perpendicular to the longitudinal direction 44 corresponds to the outer diameter of the screw shaft 28.

As can be seen from FIGS. 4, 5 and 6, the screw 26 is slidably held in the oblong hole 42. The alignment of the longitudinal direction 44 of the oblong hole 42 can be freely changed by rotating the screw guide 38 within the busbar plane 8. Depending on the alignment of the screw guide 38 and, in particular, its oblong hole 42, the screw 26 can be slid, for example, in a direction 34 extending parallel to the longitudinal direction of the busbar 4 and in a direction 36 extending perpendicular to the longitudinal direction of the busbar. This is indicated by the arrows 48 and 50, respectively. Therefore, the screw 26 can be slid along the busbar plane 8 as desired within the radius of movement already mentioned.

However, the hole 40 of the screw guide 38 does not necessarily have to be adapted as an oblong hole 42. According to an embodiment, the hole 40 of the screw guide 38 can also be adapted as a curved slot that is as wide as the screw shaft 28 and extends through the screw guide 38 parallel to the busbar plane 8. Alternatively, the hole 40 of the screw guide 38 can also be circular and have an inner diameter corresponding to the outer diameter of the screw shaft 28. The circular hole of the screw guide 38 is preferably arranged offset from the center of rotation of the screw guide. Thus, the screw 26 is movable by rotation of the screw guide 38 at least on a circular path parallel to the busbar plane 8.

The screw guide 38 is adapted to be positively connected to the busbar 4 or to the contact bridge 18. In particular, the screw guide 38 and the busbar 4 or the contact bridge 18 can form a unilateral positive connection perpendicular to the busbar plane 8. For this purpose, the screw guide 38 has a flange-shaped section 52 that is supported on the contact bridge 18. Alternatively, or additionally, the flange-shaped section 52 can also be supported on a flat face 6 of the busbar 4. The flange-shaped section 52 forms, for example, a continuous outer flange 54 extending circumferentially of the screw guide 38 around the cylindrical section 56. The outer flange 54 has an outer diameter that is at least greater than the inner diameter of the central opening 20 of the contact bridge 18, or greater than the inner diameter of the through opening 16 of the busbar 4. Thus, the screw guide 38 has a stepped edge. In other words, the outer edge of the screw guide 38 has a stepped shoulder 60 formed by the flange-shaped section 52 and cylindrical-shaped section 56. As can be seen from FIG. 4, the screw guide 38, in particular the cylindrical section 56 on the side of the contact bridge 18 opposite the flange-shaped section 52, does not protrude from the central opening 20 of the contact bridge. Furthermore, the screw guide 38, in particular the cylindrical section 56 on the side of the busbar 4 opposite the flange-shaped section 52, does not protrude from the through opening 16 of the busbar.

The module connector 1 also has at least one contact ring 62 made of an electrically conductive material, for example aluminum, copper or their alloys. The contact ring 62 is adapted in the shape of a hollow cylinder with a circular base surface 68 and a circular end surface 70. At the base surface 68, the contact ring 62 forms a predefined interface 64 to a mating contact 66 of one of the two electric modules 10.

With its end surface 70, the contact ring 62 abuts the contact bridge 18 on a side of the contact bridge opposite the flange-shaped section 52 of the screw guide 38. In order to increase the contact area between the contact bridge 18 and the contact ring 62, the contact bridge has a widened end surface 72 and the contact ring 62 has a widened end surface 70. If no contact bridge 18 is provided, the contact ring 62 can also be in direct contact with the flat face 6 of the busbar 4 opposite the flange-shaped section 52 of the screw guide 38. Further, the contact ring 62 has a continuous ring opening 74 aligned with the hole 40 of the screw guide 38 perpendicular to the busbar plane 8. The screw shaft 28 of the screw 26 is inserted into the ring opening 74 at least sectionally.

As can further be seen from FIG. 4, the module connector 1 has an electrically insulating housing 76 as finger and contact protection, in which the busbar 4, the contact bridge 18, the contact ring 62, the screw 26 and the screw guide 38 are received at least sectionally. A cap 88 is molded onto the screw head 32 of the screw 26 as part of the finger and contact protection. According to an embodiment not shown, a cap can also be placed or molded on a tip of the screw shaft 28 facing away from the screw head 32 as part of the finger and contact protection.

The housing 76 comprises a first housing part 78, which is movement-transmittingly connected to the screw 26 and is movable relative to the busbar 4. The first housing part 78 forms a cover which, in all sliding positions of the screw 26, covers the busbar 4, the screw, the screw guide 38 and the contact bridge 18 together with the rest of the housing 76. In particular, the cover can ensure that there are no gaps that would allow human fingers to touch these components.

The exemplary housing 76 further comprises a second housing part 80, which is connected to the first housing part 78 via the screw 26 and via the contact ring 62 in a movement-transmitting manner and is movable relative to the busbar 4. The second housing part 80 is arranged opposite the first housing part 78 with respect to the busbar 4. The second housing part 80 covers the contact ring 62, which is located on the opposite side of the busbar 4.

The housing 76 further comprises a first housing shell 82 and a second housing shell 84, wherein the two housing shells 82, 84 are adapted to be latched together. The two housing shells 82, 84 each have a housing opening 86. The first housing part 78 is inserted into the housing opening 86 of the first housing shell 82, while the second housing part 80 is inserted into the housing opening 86 of the second housing shell 84. The first housing part 78 and the second housing part 80 have a stroke or radius of movement within the respective housing opening 86.

The first housing part 78 has a protective collar 94 which extends around the screw 26 and, in all sliding positions, overlaps at least sectionally with the first housing shell 82 perpendicular to the busbar plane 8. The second housing part 80 also has a protective collar 96 which extends around the contact ring 62 and, in all sliding positions, overlaps at least sectionally with the second housing shell 84 perpendicular to the busbar plane 8. The respective protective collar 94, 96 preferably extends in a flange shape and parallel to the busbar plane 8.

The first housing part 78 further includes a protective sleeve 98 extending circumferentially around the screw 26 and projecting perpendicularly from the protective collar 94 in the axial direction. The screw 26 is rotatable about an axis of rotation 102 and is slidably held in the protective sleeve 98 along the axis of rotation. The second housing part 80 in turn has a protective sleeve 100 which extends circumferentially around the contact ring 62 and projects perpendicularly from the protective collar 96 in the axial direction. The housing shells 82, 84 are assembled and closed around the busbar 4, the contact bridge 18, the screw 26, the screw guide 38 and the contact ring 62. Prior to assembly, the first housing part 78 and the second housing part 80 are inserted into the respective housing opening 86.

The first housing part 78 is embodied as a replaceable separate intermediate ring 90 and is located between the first housing shell 82 and the screw head 32 of the screw 26. In particular, the intermediate ring 90 captively holds the screw 26 and the screw guide 38 while itself being captively held between the first housing shell 82 and the busbar 4. For this purpose, the protective collar 94 of the first housing part 78 comprises an outwardly facing flange 104. The first housing shell 82 accordingly comprises an inward-facing flange 106 at its housing opening 86. The flanges 104, 106 overlap at least sectionally in all sliding positions. In particular, the inner diameter of the inwardly facing flange 106 is less than or equal to the outer diameter of the outwardly facing flange 104. Furthermore, the inner diameter of the inwardly facing flange 106 is greater than the outer diameter of the protective sleeve 98.

The second housing part 80 is also embodied as a separate intermediate ring 92 and is located between the second housing shell 84 and the contact ring 62. In particular, the intermediate ring 92 captively holds the contact ring 62 while itself being captively held between the second housing shell 84 and the busbar 4. For this purpose, the protective collar 96 of the second housing part 80 has an outwardly facing flange 108. The second housing shell 84 has a corresponding inwardly facing flange 110 at its housing opening 86. The flanges 108, 110 overlap at least sectionally in all sliding positions. In particular, the inner diameter of the inwardly facing flange 110 is less than or equal to the outer diameter of the outwardly facing flange 108. Furthermore, the inner diameter of the inwardly facing flange 110 is greater than the outer diameter of the protective sleeve 100.

The connection assembly 2 shown in FIG. 3 has a module connector 1, wherein the busbar 4 of the module connector has a through opening 16 at each of the two end sections 14. Furthermore, the end sections 14 are each provided with a screw guide 38, a screw 26, a contact bridge 18 and a contact ring 62. In particular, both end sections 14 are identical to one another. The connection assembly 2 further comprises for each electric module 10 a contact element 112 and a mating piece or part 114 for the respective screw 26. The mating parts 114 are adapted as threaded sleeves 116 with an internal thread 118 complementary to the external thread 30 of the screw shaft 28. The contact elements 112 are adapted to make electrically conductive contact with the module connector 1 when the screws 26 and the mating parts 114 are screwed together. The contact elements 112 contact the respective contact rings 62 at their base surfaces 68 forming the interfaces 64. If no contact rings 62 are provided, the contact elements 112 can also contact the busbar 4 or contact bridge 18 directly.

If the installation positions of the contact elements 112 and mating parts 114 deviate from a specified nominal position, this positional tolerance can be compensated for by moving the screws 26 together with the contact rings 62 to the actual installation positions. If necessary, the screw guides 38 are rotated to the correct position. The screws 26 and contact rings 62 are rotatable and slidable until the screws are fully screwed on the respective threaded sleeves. After screwing, the resulting frictional forces and positive connections prevent rotatability and slidability. Alternatively, one of the end sections 14 of the busbar 4 may be directly welded, screwed, or otherwise stationarily installed to one of the electric modules 10 (see FIG. 4). In this case, the connection assembly 2 would require only one contact element 112 and one mating part 114 to the screw 26.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A module connector for electrically connecting two electric modules, comprising:
- a busbar, including:
  - at least one flat face defining a busbar plane; and
  - a through opening extending perpendicularly to the busbar plane and through the busbar;
- at least one screw held in the through opening, rotatable relative to the busbar and slidable parallel to the busbar plane;
- at least one screw guide rotatable relative to the busbar and held at least sectionally in the through opening, the at least one screw guide having a hole extending parallel to the through opening in which the at least one screw is held at least sectionally; and
- at least one contact bridge including a central opening extending parallel to the through opening, the at least one contact bridge is at least sectionally fixed within the through opening of the busbar.

2. The module connector according to claim 1, wherein the hole of the at least one screw guide is an oblong hole.

3. The module connector according to claim 2, wherein the oblong hole extends in a longitudinal direction parallel to the busbar plane.

4. The module connector according to claim 1, wherein the at least one screw guide comprises a flange-shaped section supported on the at least one flat face of the busbar.

5. The module connector according to claim 4, wherein the at least one screw guide does not protrude from the through opening on the side of the busbar opposite the flange-shaped section.

6. The module connector according to claim 1, wherein the at least one screw guide is disk-shaped.

7. The module connector according to claim 1, wherein the at least one screw guide is rotatably held in the central opening at least sectionally.

8. The module connector according to claim 1, further comprising at least one contact ring abutting the contact bridge and including a ring opening aligned with the hole of the at least one screw guide.

9. The module connector according to claim 8, wherein the at least one contact ring is connected to the at least one screw in a movement-transmitting manner.

10. The module connector according to claim 8, wherein the at least one screw comprises a screw shaft having an external thread and a screw head fastened to the screw shaft, the at least one contact ring is placed onto the screw shaft on the side of the busbar opposite the screw head.

11. The module connector according to claim 1, further comprising an electrically insulating housing in which the busbar, the at least one screw and the at least one screw guide are received.

12. The module connector according to claim 11, wherein the housing comprises a first housing part connected in a movement-transmitting manner to the at least one screw, the first housing part movable relative to the busbar and forming a cover which, in all sliding positions of the at least one screw, covers the busbar together with a remainder of the housing.

13. The module connector according to claim 12, wherein the first housing part comprises a protective collar extending around the at least one screw and overlapping at least sectionally with the rest of the housing perpendicular to the busbar plane in all sliding positions of the at least one screw.

14. The module connector according to claim 12, wherein the first housing part is a separate component from the at least one screw.

15. The module connector according to claim 12, wherein the housing comprises a second housing part connected to the first housing part via the at least one screw in a movement-transmitting manner, the second housing part is movable relative to the busbar and is arranged opposite the first housing part with respect to the busbar.

16. A connection assembly, comprising:
- A module connector, including:
  - a busbar, having:
    - at least one flat face defining a busbar plane; and
    - a through opening extending perpendicularly to the busbar plane and through the busbar;
  - at least one screw held in the through opening, rotatable relative to the busbar and slidable parallel to the busbar plane;
  - at least one screw guide rotatable relative to the busbar and held at least sectionally in the through opening, the at least one screw guide having a hole extending parallel to the through opening in which the at least one screw is held at least sectionally; and at least one contact bridge including a central opening extending parallel to the through opening, the at least one contact bridge is at least sectionally fixed within the through opening of the busbar;

at least one contact element; and at least one mating piece adapted to threadably receive the at least one screw, the contact element is adapted to make electrically conductive contact with the module connector in a screwed-together state of the at least one screw and the mating piece.

17. The connection assembly according to claim 16, wherein the contact element forms part of a battery module.

18. The connection assembly according to claim 16, wherein:

the at least one screw includes a first screw arranged through a first end of the busbar, and a second screw arranged through a second end of the busbar opposite the first end;

the at least one screw guide includes a first screw guide arranged through the first end of the busbar, and a second screw guide arranged through the second end of the busbar; and the at least one contact element includes a first contact element electrically connected to the first screw and associated with a first battery module, and a second contact element electrically connected to the second screw and associated with a second battery module, the busbar electrically connecting the first contact element to the second contact element.

19. The connection assembly according to claim 16, wherein the hole of the at least one screw guide is an oblong hole.

20. The connection assembly according to claim 16, wherein the at least one screw guide is rotatably held in the central opening at least sectionally.

21. A module connector for electrically connecting two electric modules, comprising:

a busbar, including:

at least one flat face defining a busbar plane; and a through opening extending perpendicularly to the busbar plane and through the busbar;

at least one screw held in the through opening, rotatable relative to the busbar and slidable parallel to the busbar plane;

at least one screw guide rotatable relative to the busbar and held at least sectionally in the through opening, the at least one screw guide having a hole extending parallel to the through opening in which the at least one screw is held at least sectionally; and an electrically insulating housing in which the busbar, the at least one screw and the at least one screw guide are received, the housing comprises a first housing part and a second housing part connected to the first housing part via the at least one screw in a movement-transmitting manner, the second housing part is movable relative to the busbar and is arranged opposite the first housing part with respect to the busbar.

* * * * *